United States Patent Office 3,453,362
Patented July 1, 1969

3,453,362
INSECT CONTROL METHODS AND
COMPOSITIONS
Philip A. Cruickshank, Princeton, N.J., assignor to
FMC Corporation, New York, N.Y., a corporation of Delaware
No Drawing. Filed May 10, 1966, Ser. No. 548,854
Int. Cl. A01n 9/20, 17/14; C07d 1/20
U.S. Cl. 424—84                                    12 Claims

ABSTRACT OF THE DISCLOSURE

A composition for controlling insect maturation in specific species of insect pests, comprising a juvenile hormone mimicking compound of the formula

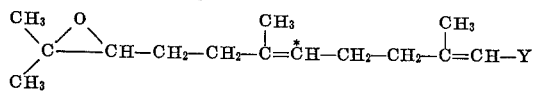

where Y is —COOR, —CH$_2$OR and —CH$_2$NR$_2$, where R is lower alkyl and * denotes a Δ-6 trans configuration, with a suitably attractive species-specific bait carrier in an amount for specifically attracting specific species of insect pests.

---

This invention relates to methods and materials for controlling insects and more particularly to the control of insect populations by the use of compositions containing novel and potent juvenile hormone mimics.

Juvenile hormone mimics are compounds that inhibit normal metamorphic maturation in insects. Known juvenile hormone mimics include farnesol and its ethers and esters as are disclosed in German Patent 1,140,394. These materials act by topical or contact absorption. In general, the amounts of known hormone mimics necessary for effectively inhibiting maturation of insects are so great that normal absorpton rates from contact exposure will not provide absorption of maturation-inhibiting amounts of the material by the immature insect. This shortcoming, among others, has prevented practical use of these materials for large-scale insect control.

It is an object of this invention to provide juvenile hormone mimics that are effective against insects in amounts absorbable by contact with their environment.

It is an object of this invention to provide compositions containing juvenile hormone mimics that can be used to control insect populations when applied to the insect or its environs and absorbed therefrom.

It is a further object of this invention to provide compositions containing juvenile hormone mimics that are effective in controlling or delaying insect maturation even at dosage levels of less than 1 μgm. of juvenile hormone per pupa.

These and other objects are achieved by the use of compositions comprising effective amounts of juvenile hormone mimicking compounds of the structural formula:

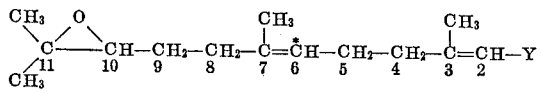

having the trans configuration at the asterisk, where Y is selected from the group consisting of —COOR, —CH$_2$OR, and CH$_2$NR$_2$ radicals in which R is a lower alkyl group of less than 6 carbon atoms. These compounds are each effective at dosages of less than 1 μgm. per pupa in representative insect species. Such an effect from epoxidizing an unsaturated linkage is completely unforeseen in this art.

The juvenile hormone mimics of this invention are preferably prepared from farnesol, a naturally occurring sesquiterpenoid in Oil of Cassia. Another source of farnesol is nerolidol from Oil of Neroli. The naturally occurring farnesol contains up to 80% of the Δ-6 trans isomer which is the biologically active isomer for preparing the juvenile hormone mimics of this invention. To the extent that any Δ-6 cis isomer is present, it is substantially biologically inactive and serves as a diluent.

The farnesol starting material is first converted to farnesyl compounds having functional groups at the C$_1$ carbon that are not affected by epoxidizing agents. Such shielded compounds include farnesyl ethers, esters, or N-substituted amines which are known compounds and methods for their preparation as disclosed in the aforesaid German patent. These compounds are then epoxidized to form an oxirane ring at C$_{10-11}$.

Two epoxidation methods are preferred to form the C$_{10-11}$ oxirane ring on the farnesyl moiety.

The first method includes reacting the compound, having the shielded (C$_1$) carbon, with a hypohalous acid to form the farnesyl halohydrin. This is then converted to the epoxide by treatment with a mild base. A preferred source of hypohalous acid is N-bromosuccinimide. Hypochlorous or hypobromous acids from other sources are also useful.

Another preferred method for preparing the juvenile hormone mimics of this invention, having the C$_{10-11}$ oxirane ring, is by directly treating the compounds having the shielded (C$_1$) carbon with a per-acid. Suitable per-acids are m-chloroperbenzoic acid, perbenzoic acid, performic acid, peracetic acid, and trifluoroperacetic acid.

The hypohalous acid epoxidation reaction with the N-halosuccinamide is preferably carried out in the presence of a small amount of water in a water-miscible solvent for the starting material, such as 1,2-dimethoxyethane, dioxane, or dimethylformamide. Upon completion of the halohydrin formation, the reaction mixture may be diluted with water and the farnesyl halohydrin extracted with a water-immiscible organic solvent. Suitable extractants are the liquid hydrocarbons, such as hexane, chlorinated hydrocarbons, esters, and ethers. After removal of the solvent, the halohydrin is converted to the epoxide under mildly basic conditions. An amine such as triethylamine or pyridine is a suitable base for this conversion which is preferably carried out in an inert solvent such as dimethylformamide. Dilute aqueous inorganic bases may also be used. The hydrohalide of the amine is filtered off and the resultant epoxide, in solution, may be diluted with an inert solvent such as a liquid hydrocarbon. If necessary, the liquid epoxidized farnesyl compound can be purified by vacuum distillation.

Epoxidation by use of the per-compounds is preferably carried out in a halohydrocarbon solvent such as methylene chloride or carbon tetrachloride. The starting farnesyl compound is dissolved in the solvent and the epoxidizing agent, dissolved in another portion of solvent, is added until the reaction is complete. The products may be washed with mild alkali and then with water. The solvent is then removed. The product may be further purified by distillation, but the crude products are active juvenile hormone mimics.

An advantage in using hormone mimics for insect control is that they alter the metamorphic process, a normal metabolic process that is peculiar to most insects. Since metamorphosis as observed in insects does not have an apparent counterpart in other animals, the compounds do not have any comparable physiological effect on or toxicity to non-related animal species.

The compounds of this invention are active on contact with the juvenile forms of the insects. By application of compositions containing the active compounds in effective amounts to the environments of the insects, they are absorbed by the insects by contact with the environment and normal insect maturation is affected. The degree of effectiveness of any of the compounds of this invention depends on its concentration in the environment and the amount of absorption from the environment. Efficiency of the compounds is measured by the suppression of adult development. This ranges in degree from the complete suppression through retention of pupal abdomen, undeveloped wings, retention of pupal external genitalia, retention of abdominal cuticle tissue, retention of gin traps, immature genitalia, immature gin traps, and patches of pupal cutical tissue on the adult abdomen. Many of the insects which, when exposed to the hormone mimicking compounds, do not show external modification of mature characteristics, will be functionally sterile as a result of such exposure.

The appended examples show the preparation of hormone mimicking compounds of this invention, and demonstrate the superior biological activity of these compounds compared to the prior art materials. These examples are not in any way to be construed to limit the invention in either its composition or process aspects. Equivalent starting materials or processes which will produce these novel compounds are intended as within the scope of this invention, as are the various methods of exposing and contacting insects to the various compositions that include these novel compounds.

EXAMPLE 1

Methyl Δ-6-trans-10,11-epoxyfarnesate

To 12.5 g. of methyl farnesate (70% Δ-6 trans isomer), prepared by action of diazomethane on farnesoic acid [Childs & Bloch, J. Biol. Chem., 237, 62 (1962)] in 150 ml. of dimethyoxyethane was added 25 ml. of water. Solid N-bromosuccinimide (12.5 g.) was added over a five-minute period, together with an additional 25 ml. of water. After six hours at room temperature, the reaction mixture was poured into 150 ml. of water and the thus formed bromohydrin was extracted with hexane. The extracts were dried over magnesium sulfate, filtered, and the solvent removed under reduced pressure. The residue was dissolved in 50 ml. of 1:1 triethylamine-dimethylformamide, and the mixture heated for two hours on a steam bath. Hexane was then added to the mixture, the crystalline triethylamine hydrobromide filtered off, and the filtrate washed with water. The solvent was removed under reduced pressure and the product distilled to yield a mixture in which the major component was the desired methyl Δ-6-trans-10,11-epoxyfarnesate; B.P. 111–130°/15 mm., $n_D^{25}$ 1.4780. Gas chromatographic analysis showed the presence of methyl 10,11-epoxyfarnesate as the major component. [E. E. Von Tamelen et al., J. Am. Chem. Soc., 85, 3295 (1963)]

*Analysis.*—Calculated for $C_{16}H_{26}O_3$: C, 72.1; H, 9.8. Found: C, 71.7; H, 9.9.

EXAMPLE 2

Methyl Δ-6-trans-10,11-epoxyfarnesyl ether

Methyl farnesyl ether (3.9 g.) (75% Δ-6 trans isomer) (Belgian Patent 617,175) was treated with 3.5 g. of N-bromosuccinimide in the manner described in Example 1, and the resultant bromohydrin was converted to the epoxide by heating with 10 ml. of the 1:1 triethylamine-dimethylformamide mixture. Following the work-up of Example 1, distillation yielded mixed epoxides in which methyl Δ-6-trans-10,11-epoxyfarnesyl ether was the major component; B.P. 98–103°/0.07 mm., $n_D^{25}$ 1.4720. Gas chromatography confirmed the composition of the epoxide mixture.

*Analysis.*—Calculated for $CH_{16}H_{26}O_3$: C, 76.1; H, 11.1. Found: C, 76.1; H, 10.8.

EXAMPLE 3

Peracid epoxidation to form methyl Δ-6-trans-10,11-epoxyfarnesate

To a solution of 15.0 g. (0.06 mole) of methyl farnesate in 100 ml. of methylene chloride (cooled to 10° C.) was added a solution of 12.5 g. of m-chloroperbenzoic acid in 200 ml. of methylene chloride. After reacting for several hours at room temperature, the mixture was washed with three 150 ml. portions of 1-normal aqueous sodium hydroxide and with two 150 ml. portions of water. Evaporation of solvent under reduced pressure yielded the crude epoxide. Gas chromatographic analysis established the major component as methyl 10,11-epoxyfarnesate.

EXAMPLE 4

Peracid epoxidation to form methyl Δ-6-trans-10,11-epoxyfarnesyl ether

In the manner described in Example 3, 2.36 g. of farnesyl methyl ether was treated with 20% more than an equivalent of m-chloroperbenzoic acid. A quantitative yield of crude methyl farnesyl ether was recovered after evaporation of the solvent. Gas chromatographic analysis showed the methyl 10,11-epoxyfarnesyl ether to be the major component of the product.

EXAMPLE 5

Peracid oxidation to form ethyl Δ-6-trans-10,11-epoxyfarnesate

In the manner described in Example 3, 2.6 g. of ethyl farnesate [Childs & Bloch, J. Biol. Chem., 237, 62 (1962)] was treated with a molar equivalent of m-chloroperbenzoic acid. A quantitative recovery of crude epoxides was made after solvent evaporation. Gas chromatography established the major component as ethyl 10, 11 epoxyfarnesate.

EXAMPLE 6

Peracid oxidation of N,N-diethylfarnesylamine

To a solution of 2.77 g. of N,N-diethylfarnesylamine (Belgian Patent 617,175) and 1.14 g. of trifluoroacetic acid in methylene chloride was added 1 equivalent of m-chloroperbenzoic acid using the procedure set forth in Example 3. The crude 10,11-epoxidized N,N-diethylfarnesylamine was washed and recovered as set forth in Example 3.

EXAMPLE 7

Biological activity of epoxidized juvenile hormone mimics

The compounds of this invention were tested by dissolving them in a solvent (17 parts acetone; 4 parts dimethylsulfoxide; 2 parts peanut oil). This composition was topically applied onto fully hatched *Tenebrio molitor* pupae (less than 28 hours old) which had been immobilized by carbon dioxide narcosis. Alternatively, the compounds could be dissolved in squalene and the composition subcutaneously injected into the narcotized pupae. Ten to twenty pupae were treated at each dosage level. The dosages were administered in 1-microliter aliquots of the solution which was dispensed from a 50-microliter syringe fed from an automatic dispensing device. Controls were treated with dosage of the solvent alone.

The treated pupae, along with solvent-treated controls, were placed in separate holding containers maintained at 90° F. and 70% relative humidity for one week. At the end of this week, substantially the entire control group emerged as adult beetles. The hormone-treated insects were examined and rated for degrees of pupal (immature) characteristics and undeveloped pupae according to the following scale:

| | Response |
|---|---|
| Total suppression of adult development | 5.0 |
| Complete retention of pupal abdomen, undeveloped wings | 4.0 |
| Retention of some pupal characteristics, including external genitalia, abdominal cuticle, gin traps | 3.0 |
| Slight retention of pupal abdominal characteristics, including patches of pupal cuticle, modified gin traps, and external genitalia | 2.0 |
| Patches of pupal cuticle on abdomen | 1.0 |
| Normal development to adult | .0 |

The results of this test with the compounds of this invention are reported in Table 1. The numerical figures are the average for at least two replicates of the test groups at each concentration for each compound.

TABLE 1.—COMPARISON OF BIOLOGICAL ACTIVITY OF FARNESYL DERIVATIVES ON DEVELOPMENT OF TENEBRIO MOLITOR BEETLES

| Compound [1] | Response, 1 µ/g. | Dosage/pupa 0.1 µ/g. |
|---|---|---|
| Methyl 10,11-epoxyfarnesyl ether (Ex. 2 and 4) | 4.0 | 2.5 |
| Methyl 10,11-epoxyfarnesate (Ex. 1 and 3) | 5.0 | 3.5 |
| Ethyl 10,11-epoxyfarnesate (Ex. 5) | 3.5 | <1.0 |
| Epoxidized N,N-diethylfarnesylamine (Ex. 6) | 5.0 | 4.0 |
| Methyl farnesate | 0.0 | 0.0 |
| Farnesyl methyl ether | <1.0 | 0.0 |
| N,N-diethylfarnesylamine | 3.9 | 1.6 |

[1] Products used contained mixture of isomers, with Δ-6 trans compounds the major components.

The compounds of this invention are effective against many insects, including among others: *Periplaneta americana* (American cockroach), *Rhodnius prolixus*, milkweed bug, *Tenebrio molitor* (yellow mealworm), *Leptinotarsa decemlineata* (Colorado potato beetle), bean beetle, *Galleria mellonella* (greater wax moth), *Bombyx mori* (silkworm moth), *Antheraea polyphemus* (polyphemus moth), *Hyalophora cecropia* (cecropia moth), *Samia cynthia ricini* (cynthia moth), *Callosamia promethia* (promethia moth). It has been noted that the relative effectiveness of the compounds will vary with certain insect species; for example, the epoxidized ethyl compound is slightly more active than the epoxidized methyl compound when tested against bean bettles.

The epoxidized juvenile hormone mimics of this invention may be formulated with the additives and extenders commonly used for the application of other insect control compositions such as insecticides.

The juvenile hormone mimics are not applied full strength. They are generally incorporated in any of the adjuvants and carriers normally employed for facilitating the dispersion of active ingredients in insect-containing environments, recognizing the accepted fact that the formulation and mode of application of an insect control agent may affect the activity of the material. These compounds may be applied, for example, as sprays, dusts, granules, to the area in which control is desired, the choice of application varying, of course, with the stage and type of insect form and with the nature of the environment. Thus, these compounds may be formulated as granules of large particle size, as powdery dusts, as wettable powders, as emulsifiable concentrates, as solutions, and the like.

Dusts are admixtures of the active ingredients with finely divided solids such as talc, attapulgite clay, kieselguhr, pyrophyllite, chalk, diatomaceous earths, calcium phosphates, calcium and magnesium carbonates, sulfur, lime, flours, and other organic and inorganic solids which act as dispersants and carriers for the hormone mimic. These finely divided solids have an average particle size of less than about 50 microns. A typical dust formulation useful herein contains 10.0 parts of hormone mimic, 30.0 parts of bentonite clay, and 60.0 parts of talc.

The compounds may be made into liquid concentrates by solution or emulsion in suitable liquids, and into solid concentrates by admixture with talc, clays, and other known solid carriers used in the pesticide art. The concentrates are compositions containing about 5–50% hormone mimic and the rest inert material which includes dispersing agents, emulsifying agents, and wetting agents. The concentrates are diluted for practical application, with water or other liquid for sprays or with additional solid carrier for use as dusts. Typical carriers for solid concentrates (also called wettable powders) include fuller's earth, kaolin clays, silicas, and other highly absorbent, readily wetted inorganic diluents. A useful solid concentrate formulation for use herein contains 25.0 parts of hormone mimic, 72.0 parts of bentonite clay, and 1.5 parts each of sodium lignosulfonate and sodium laurylsulfonate as wetting agents.

Useful liquid concentrates include the emulsifiable concentrates, which are homogeneous liquid or paste compositions which are readily dispersed in water or other dispersant, and may consist entirely of the hormone mimic with a liquid or solid emulsifying agent, or may also contain a liquid carrier, such as xylene, heavy aromatic naphthas, isophorone, kerosene and other volatile or non-volatile organic solvents. For application these concentrates are dispersed in water or other liquid carrier, and normally applied as a spray to the area to be treated.

The concentration of the hormone mimic in the dilution generally used for control of insects is normally in the range of about 2% to about 0.01%. Many variations of spraying and dusting compositions in the art may be used, by substituting the compounds of this invention into compositions known or apparent to the art.

Typical wetting, dispersing, or emulsifying agents used in insect control formulations include, for example, the alkyl and alkylaryl sulfonates and sulfates and their sodium salts, alkylamide sulfonates, including fatty methyl taurides, alkylaryl polyether alcohols, sulfated higher alcohols, polyvinyl alcohols, polyethylene oxides, sulfonated animal and vegetable oils, sulfonated petroleum oils, fatty acid esters of polyhydric alcohols and the ethylene oxide addition products of such esters, and the addition products of long chain mercaptans and ethylene oxide. Many other types of useful surface-active agents are available in commerce. The surface-active agent, when used, normally comprises from 1–15% by weight of the insect control composition.

Other useful formulations include simple solutions of the active ingredient in a dispersant in which it is completely soluble at the desired concentration, such as acetone or other organic solvents. Granular formulations, wherein the toxicant is carried on relatively coarse particles, are of particular utility. These can be formulated to release the active material within the environment on contact with soil moisture.

Pressurized sprays, typically aerosols wherein the active ingredient is dispersed in finely divided form as a result of vaporization of a low-boiling dispersant-solvent carrier such as the Freons may also be used.

Baits are generally prepared by mixing liquid or solid concentrates with a suitably attractive food for the immature insect form. Many species have specific starches, odors, or proteins to which they are specifically attracted and use may be made of this in formulating the baits for such specific species.

The compositions may be formulated and applied with other active ingredients, including insecticides, fungicides, nematocides, plant growth regulators, fertilizers, etc. In applying the chemicals it is obvious that an effective amount and concentration of the juvenile hormone mimic should be employed.

The hormone mimics of this invention may be formulated with other suitable materials for subsidiary effects such as synergism, or long-acting toxicity. They may also be combined with toxicants which, while not active in the immature insect form, are toxic to predators which feed upon immature insects. Immature forms of insects are a prime food source of many species of insect and other

I claim:
1. Compositions for the control of insect maturation in specific species of insect pests comprising an effective amount of a juvenile hormone mimicking compound of the formula

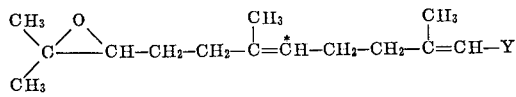

where Y is selected from the group consisting of —COOR, —CH$_2$OR, and —CH$_2$NR$_2$ radicals in which R is lower alkyl and * denotes a Δ–6 trans configuration, in admixture with a suitably attractive species-specific bait carrier in effective amounts for specifically attracting specific species of insect pests.

2. The composition according to claim 1, wherein the juvenile hormone mimicking compound content of the composition is at least 0.01% by weight.

3. The composition according to claim 1, wherein the juvenile hormone mimicking compound is methyl 10,11-epoxyfarnesate.

4. The composition according to claim 1, wherein the juvenile hormone mimicking compound is ethyl 10,11-epoxyfarnesate.

5. The composition according to claim 1, wherein the juvenile hormone mimicking compound is methyl 10,11-epoxyfarnesyl ether.

6. The composition according to claim 1, wherein the juvenile hormone mimicking compound is N,N-diethyl 10,11-epoxyfarnesylamine.

7. The method for controlling the development of specific species of insect populations which comprises the per oral administration or per oral application in maturation-inhibiting amounts, to immature forms of specific species of insect pests in locales wherein control is desired, of a composition comprising an effective amount of a suitably attractive species-specific bait carrier for specifically attracting specific species of insect pests having admixed therein an effective amount of a juvenile hormone mimicking compound of the formula:

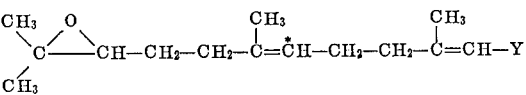

where Y is selected from the group consisting of —COOR, —CH$_2$OR, and —CH$_2$NR$_2$ radicals in which R is lower alkyl and * denotes a Δ–6 trans configuration.

8. The method of claim 7, wherein the juvenile hormone mimicking compound is methyl 10,11-epoxyfarnesate.

9. The method of claim 7, wherein the juvenile hormone mimicking compound is ethyl 10,11-epoxyfarnesate.

10. The method of claim 7, wherein the juvenile hormone mimicking compound is methyl 10,11-epoxyfarnesyl ether.

11. The method of claim 7, wherein the juvenile hormone mimicking compound is N,N-diethyl 10,11-epoxyfarnesylamine.

12. A composition for insect control according to claim 1 wherein the composition includes an attractant for specific insect pests.

References Cited

FOREIGN PATENTS 989,554  4/1965  Great Britain.

OTHER REFERENCES

Van Tamelen et al., J.A.C.S. 85: 3295–3296 (1963).

Bowers, W. S. et al., Life Sciences 4 (23): 2323–2331 (December 1965) Juvenile and Gonadotrophic Hormone Activity of 10,11-epoxyfarnesenic acid methyl ester.

S. K. ROSE, *Primary Examiner.*

U.S. Cl. X.R.

260—278, 348, 348.5, 348.6, 633

PO-1050
(5/69)

UNITED STATES PATENT OFFICE
CERTIFICATE OF CORRECTION

Patent No. 3,453,362          Dated July 1, 1969

Inventor(s) Philip A. Cruickshank

It is certified that error appears in the above-identified patent and that said Letters Patent are hereby corrected as shown below:

Column 3 - line 51 (pp 6 - line 19 of application) should be "111-130°/0.15"

SIGNED AND
SEALED
JUL 21 1970

(SEAL)
Attest:

Edward M. Fletcher, Jr.
Attesting Officer

WILLIAM E. SCHUYLER, JR.
Commissioner of Patents